United States Patent
Tremblay et al.

(10) Patent No.: US 6,270,717 B1
(45) Date of Patent: Aug. 7, 2001

(54) MOLTEN METAL FILTRATION AND DISTRIBUTION DEVICE AND METHOD FOR MANUFACTURING THE SAME

(75) Inventors: Sylvain P. Tremblay, Jonquiére; Réjean Dault, Drummondville; Pierre Legast, Sherbrooke; Pierre Delvaux, Bromptonville, all of (CA)

(73) Assignee: Les Produits Industriels de Haute Temperature Pyrotek Inc., Quebec (CA)

( * ) Notice: Subject to any disclaimer, the term of this patent is extended or adjusted under 35 U.S.C. 154(b) by 0 days.

(21) Appl. No.: 09/034,337

(22) Filed: Mar. 4, 1998

(51) Int. Cl.$^7$ ........................................ C21B 3/04
(52) U.S. Cl. ..................... 266/230; 222/594; 222/606
(58) Field of Search ................... 222/606, 607, 222/594; 266/230, 227

(56) References Cited

U.S. PATENT DOCUMENTS

| | | | |
|---|---|---|---|
| 3,729,097 | * 4/1973 | Collins et al. | 266/227 |
| 5,207,974 | 5/1993 | Yun | 266/230 |
| 5,362,690 | 11/1994 | Delvaux et al. | 501/95 |
| 5,871,660 | * 2/1999 | Xu et al. | 222/606 |

FOREIGN PATENT DOCUMENTS 0 296 768   12/1988   (EP) .

* cited by examiner

*Primary Examiner*—Scott Kastler
(74) *Attorney, Agent, or Firm*—Foley & Lardner

(57) ABSTRACT

There is provided a filtration and distribution device for a molten metal, which is in the form of a bag having parts made of a solid heat-resistant fabric and open areas made of an open weave heat-resistant fabric. At least some of the parts made of the solid heat-resistant fabric are replaced by rigid parts made of a moldable or thermo-formable composite consisting of an open weave heat-resistant fabric embedded into a matrix made of a heat-resistant inorganic material compatible with the open weave heat-resistant fabric. Preferably, the open weave heat-resistant fabric forming the open areas of the bag, is made of yarns that are rigidified and protected by application thereto of a heat-resistant coating. This coating is preferably made of a heat-resistant inorganic material applied by spraying or dipping after the yarns are weaved. The rigidification can be achieved naturally or by thermal treatment. There is also provided a distribution device for a molten metal, which comprises a hollow body provided with an outlet connectable to a molten metal feed pipe and at least one outlet through which the molten metal fed into the body may escape. This hollow body is made of the very same moldable and thermo-formable composite already mentioned hereinabove.

15 Claims, 5 Drawing Sheets

MOLTEN METAL FILTRATION AND DISTRIBUTION DEVICE AND METHOD FOR MANUFACTURING THE SAME

BACKGROUND OF THE INVENTION a) Field of the Invention

The present invention relates to a method for manufacturing filtration and distribution devices of improved structure for handing molten metals, especially molten aluminum.

The invention also relates to the molten metal filtration and distribution devices of improved structure that are so-obtained.

b) Brief Description of the Prior Art

During metal casting, especially aluminum casting, it is of common practice to use a bag made from a heat-resistant fabric, like a glass fiber fabric, in order to filtrate the molten metal that is being poured through a spout, and to distribute it all over the mold surface. Of course, the shape and dimensions of the bag depend on the molding technology and the casting parameters. Presently, there are mainly two different types of bags used in the metallurgical industry.

Figure 1:
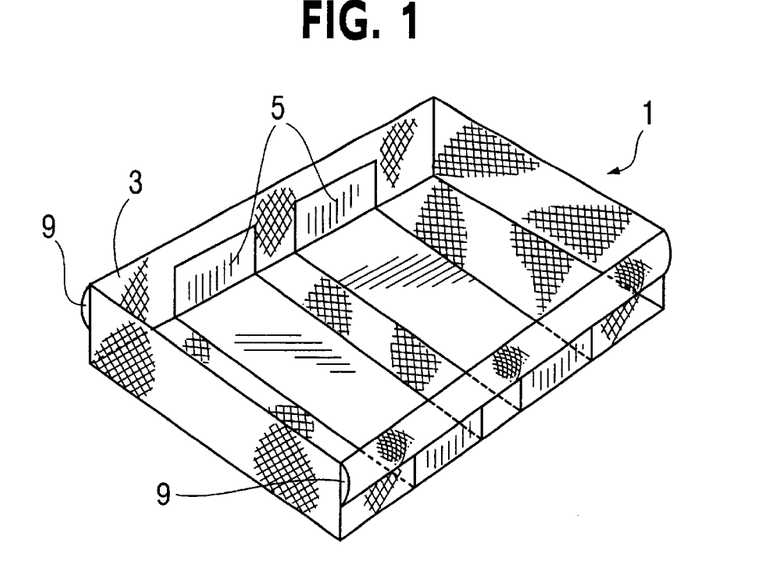
FIG. 1 is a perspective view of a "channel bag" of conventional structure.

The first type of bags include bags of large sizes that are made of a fine mesh glass fiber fabric. These bags are often called "channel bags" and a typical example thereof is shown in FIG. 1 of the accompanying drawings. As can be seen, the illustrated channel bag 1 is in the form of a rectangular pan 3 which is made of an open weave heat-resistant fabric, preferably an open weave fabric made of glass fibers, whose purpose is to let the molten metal flow down into the mold. The pan 3 is provided with reinforcing bands or areas 5 made of a dense heat-resistant fabric. These reinforcing areas 5 extend over the bottom and some portions of the sides of the pan and gives extra-strength and rigidity to the bottom of the pan. The bag can be attached under the pouring spot with a set of rods inserted into hems 9 provided for this purpose on the lateral sides of the pan 3.

The second type of bags used in the industry include bags of much more complex structure, which are made of several parts of fiberglass fabrics sewn to each other. These bags called "combo bags" in the industry, are usually smaller in dimensions than the channel bags and mostly used with automatic casting control. A typical example of combo bag is shown is illustrated in FIGS. 2 to 6 of the accompanying drawings. As can be seen, the illustrated combo bag 11 which can be 13" long, 5" wide and 4" high, comprises a main body 13, an outer shell 15, end patches 17, bottom and reinforcement patches 19, and positioning tabs 21 all made of heat-resistant fabrics, preferably fiberglass fabrics. All these parts of different shapes and functions and are sewn together as will now be described in great detail.

Figure 3:
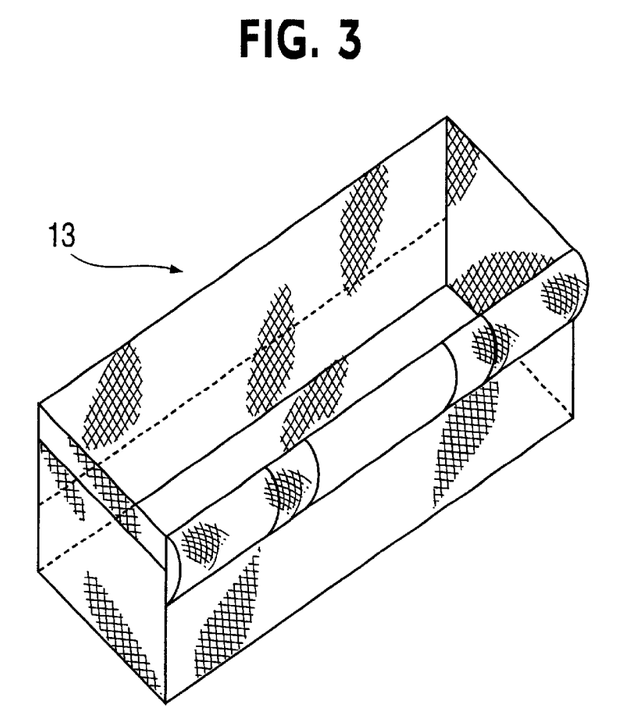
FIG. 3 is a perspective view of the main body of the combo-bag shown in FIG. 2.

The main body 13 is better shown in FIG. 3. It consists of a rectangular box with an open top made of an open-weave glass fiber fabric. The size of the openings of the fabric can vary depending on the weave construction and the type of yarns used. This fabric controls the distribution, the spread and the speed of metal around the mold in order to get the best temperature profile.

Figure 4:
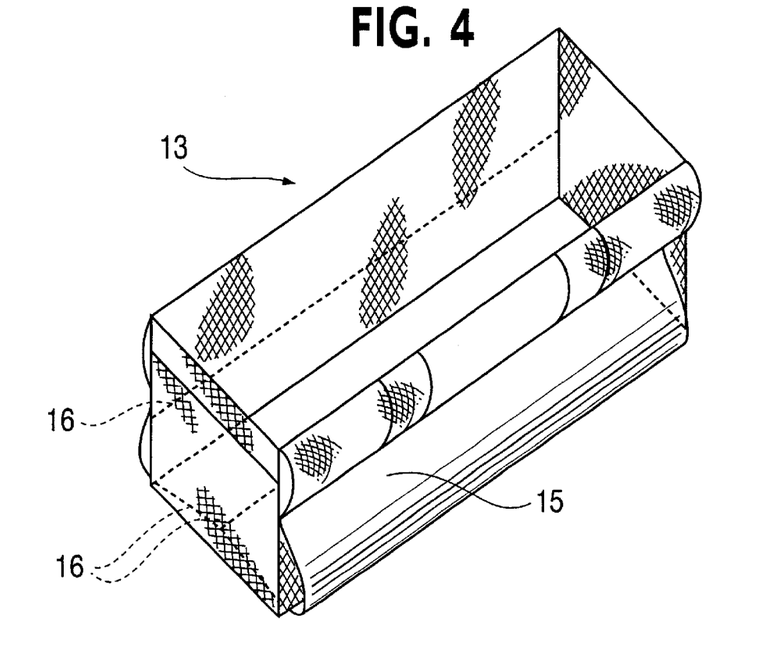
FIG. 4 is a perspective view of the main body and the outer shell of the combo bag shown in FIG. 2.

The outer shell 15 is shown in assembled position onto the main body 13 in FIG. 4. It consists of a piece of a solid glass fiber fabric which is designed to control the direction of the metal flow, retain oxides and reduce turbulence associated by the change in flow direction from vertical to horizontal. It is sewn to the main body 13 along the length of the sides and bottom thereof, at mid-height and width, respectively (see the sewing lines 16).

Figure 5:
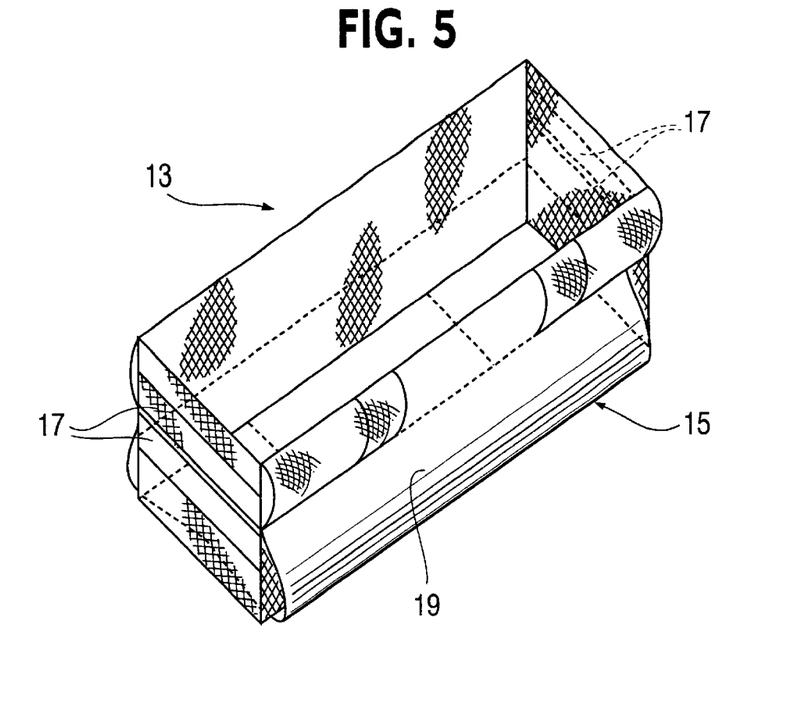
FIG. 5 is a perspective view of the main body, the outer shell, the end patches and the bottom and reinforcement patches of the combo bag shown in FIG. 2.

The end patches 17 are shown in assembled position onto the main body 13 in FIG. 5. They also consist of pieces a solid fiberglass fabric sewn in the top portions of the side ends of the main body 13. The main role of those patches is to keep the oxides generated by the turbulence inside the bag. As aforesaid, the patches are located at the ends of the bag and are high enough to direct the flow below the surface level of the metal poured into the combo bag.

The bottom and reinforcement patches 19 are also shown in assembled position in FIG. 5 (only one of them is actually shown, in dotted lines). They consist of pieces of a dense solid glass fiber fabric. These patches 19 are fixed to the bottom of the main body 13 or of the outer shell 15. Their length can be variable depending on the desired stiffness. They act to spread the metal sideways, to protect the filtering fabric of the main body 13 from burn through, to minimize the bag deformation under the metal pressure at the cast start and to avoid vertical diffusion.

Figure 6:
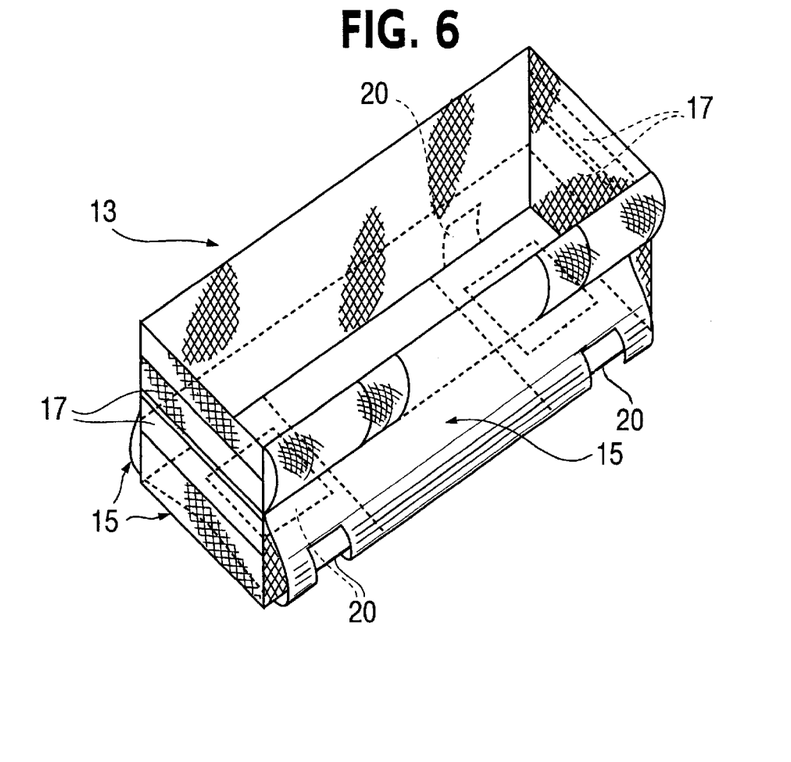
FIG. 6 is a perspective view similar to the one shown in FIG. 5, wherein the bottom holes and side windows provided in the outer shell of the combo bag shown in FIG. 2 are illustrated.

As is shown in FIG. 6, bottom holes and side windows 20 are provided in the outer shell 15 to control the flow of metal by minimizing hot spots around the mold. These windows 20 also help to drain the bag at the end of the cast.

Figure 2:
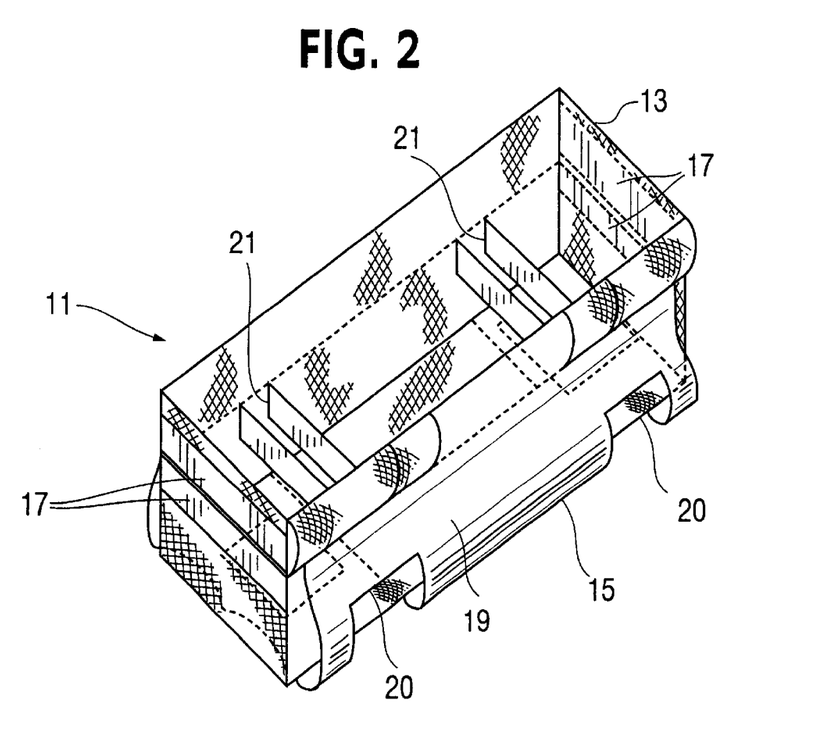
FIG. 2 is a perspective view of a "combo bag" of conventional structure.

Last of all, the positioning tabs 21 are shown in FIG. 2. They consist of pieces of thin and dense glass fiber fabric that extend transversally across the open top of the main body 13 of the bag to correctly locate the bag around the pouring spout.

All those different parts 13, 15, 17, 19 and 21 are sewn together in a certain order to optimize the production time and to reduce the production costs.

Before sewing, a coating is usually applied onto the fabric to improve its chemical resistance to the molten metal and to increase the stiffness of the bag. Such an Increase in stiffness is important to maintain an even flow and a good molten metal temperature profile during the cast.

There are many different coatings that are used in the industry PVA, ceramic and phenolic resin are good examples. All these known coatings have an organic part which burns off at the molten metal temperature. Sometimes, the generated smoke is not toxic but in certain cases, depending on the coating composition, such a smoke may be toxic.

As can be understood, the construction of the open weave and solid fabrics used to make the bag as well as the type of yarns used to weave these fabrics, have a substantive influence on the rigidity, the chemical resistance to molten aluminium and the metal flow distribution. Without going in too much details, the characteristics that are generally wanted for the combo bags are:

a sufficient stiffness to ensure an even molten metal flow;

a good chemical resistance to the molten metal, especially molten aluminum and high magnesium alloys;

a certain amount of deformation to accommodate the change in flow direction;

a smokeless and non-toxic behaviour at molten metal temperature; and a non-expensive cost.

As it can now be appreciated, the bags used in the metallurgical industry, and more particularly the combo bags, are of very complex structure and call for many different parts and a very specific selection of fabrics and finishes.

SUMMARY OF THE INVENTION

A first object of the present invention is to provide a filtration and distribution device for a molten metal which is in the form of a bag as mentioned hereinabove, but which is of much less complex structure than the existing bags made of fabrics exclusively and has an improved metallurgical performance.

Another object of the invention is to provide a method for manufacturing such an improved filtration and distribution device, which method is faster and therefore cheaper than the methods presently used for manufacturing the existing bags.

A further object of the invention, which derives from the technology used to fulfill the above objects, is to provide another kind of filtration and distribution device for a molten metal, which is fast and easy to manufacture, and which, contrary to the combo and channel bags used so far in the industry, can be completely immersed into the molten metal. When it is so immersed, this device acts as a "diffuser".

Basically, the invention consists in replacing at least part of the solid fabric used so far for the manufacture of the pan of a channel bag or the outer shell, end patches and/or bottom and reinforcement patches of a combo bag by a rigid composite consisting of an open weave heat-resistant fabric embedded into a matrix made of a heat-resistant inorganic material. This matrix will also be referred hereinafter to as RFM (rigid filter media).

Thus, in accordance with the invention, there is provided a filtration and distribution device for a molten metal, which is in the form of a bag having parts made of a solid heat-resistant fabric and open areas made of an open weave heat-resistant fabric, wherein at least some of the parts made of the solid heat-resistant fabric are replaced by rigid parts made of a moldable or thermo-formable composite consisting of an open weave heat-resistant fabric embedded into a matrix made of a heat-resistant inorganic material compatible with the open weave heat-resistant fabric.

In accordance with a preferred embodiment of the invention, the open weave heat-resistant fabric forming the open areas of the bag, is made of yarns that are rigidified and protected by application thereto of a heat-resistant coating. This coating is preferably made of a heat-resistant inorganic material and can be applied by spraying or dipping after the yarns are weaved. The rigidification can be achieved naturally or by thermal treatment. Preferably, such a rigidification is made within a mold to give to the fabric a requested shape.

In accordance with another aspect of the invention, there is also provided a distribution device for a molten metal, which comprises a hollow body provided with an intlet connectable to a molten metal feed pipe and at least one outlet through which the molten metal fed into the body may escape. This hollow body is made of the very same moldable and thermo-formable composite as already mentioned hereinabove.

Thanks to its structure, this device can be immersed into the molten metal and thus be used as a diffuser. It preferably comprises more than one outlet. Moreover, each of these outlets is preferably "closed" by a screen made of the very same type of open weave heat-resistant fabric with yarns rigidified and protected by a heat-resistant coating as mentioned hereinabove. Thus, the device may act not only as a diffuser but also as a filter.

The invention will be better understood upon reading the following non-restriction detailed description thereof.

DETAILED DESCRIPTION OF THE INVENTION

As aforesaid, a first object of the invention is to provide a filtration and distribution device in the form of a channel bag or a combo bag, wherein at least some of the parts made so far of a solid heat-resistant fabric are replaced by rigid parts made of composite consisting of an open weave heat-resistant fabric embedded into a matrix made of a heat-resistant inorganic material.

In the case of a channel bag 1 as shown in FIG. 1, the parts that are so replaced can be the reinforcing bands or areas of the pan 3, or portions of them.

In the case of the combo bag 11 shown in FIGS. 2 to 6, the parts that are replaced can be the main body 13 and/or the outer shell 15 and/or the end patches 17 and/or the bottom and reinforcement patches 19 and/or the positioning tabs 21.

The inorganic material used to make the matrix (RFM) can be of any type provided that:

it is compatible with the fabric that is embedded therein;

it can be molded or thermo-formed; and it is rigid, strong and sufficiently heat-resistant to handle molten metal and remain rigid at molten metal temperature.

This inorganic material can be a glue made from colloidal silica like the one sold under the tradename QF-150 and 180. It can also be a sodium or potassium silicate slurry or a zircon-based coating like the one sold under the tradename EZ 400. However, in accordance with a particularly preferred embodiment of the invention, this inorganic material is a moldable refractory composition containing wollastonite and colloidal silica as main components, as is disclosed in copending patent application Ser. No. 08/012,206 filed on Jan. 23, 1998, (now U.S. Pat. No. 5,880,046) with designation of Pierre DELVAUX et al as inventors. The moldable composition disclosed in this application which is incorporated herein by reference, comprises 8 to 25% by weight of an aqueous phosphoric acid solution having a concentration of phosphoric acid ranging from 40 to 85% and preferably 55% by weight, with up to 50% of the primary acidic function of the acid phosphoric acid neutralized by reaction with vermiculite. It also comprises from 75 to 92% by weight of a mixture containing wollastonite or a mixture of wollastonite of different grades, and an aqueous suspension containing from 20 to 40% by weight of colloidal silica, especially the one sold under the trademark LUDOX® HS-40. The weight ratio of the aqueous suspension to the wollastonite within the mixture ranges from 0.5 to 1.2. This composition is particularly interesting in that it meets all the basic requirements mentioned hereinabove to form an acceptable matrix, and it can be unmolded within a very short period of time that is less than 2 hours and can be as small as 10 minutes.

To prepare the rigid parts intended to replace at least some of the parts used so far that made of solid glass fiber fabric, one may prepare a slurry of the selected RFM and impregnate the open weave fabric with this slurry either by direct application or by dipping. The resulting product may then be left in a mold of preselected shape until the matrix has hardened. In the case of the composition disclosed in the above mentioned copending application, the rigid parts can be unmolded in less than two hours, without need of any drying and/or heating steps eventhough a 10 hours drying at ambient temperature followed by a 5 hours firing at 375° C. is preferred. In the other cases, heating of the product within the mold is actually required so that rigidification takes place.

Figure 7:
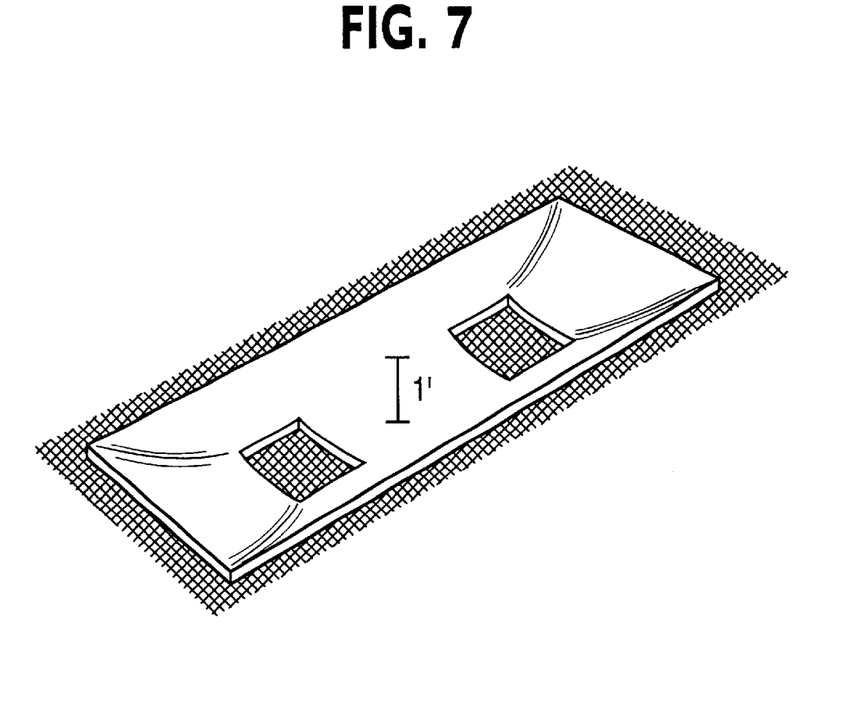
FIG. 7 is a perspective view of the bottom portion of a combo bag according to the invention, which is made of a rigid composite consisting of an open weave fabric embedded into a matrix made of a heat-resistant inorganic material.

The rigid part that is so-obtained has the preselected shape corresponding to the user's need. By way of example, as shown in FIG. 7, the composite can be in the form of an elongated piece having a central deformation about 1" deep. Of course, any other shape can be given to this composite whose embedded fabric may project outwardly all around its periphery and be sewn with the other fabric parts of the bag.

As can be appreciated, the use of an open weave fabric (32L for instance) instead of a solid fabric further manufacture of some of the parts of the bag permits to reduce the manufacturing cost, as open-weave fabrics are less expensive than solid fabrics.

The use of one or more rigid parts as disclosed hereinabove permits also to reduce the manufacturing cost inasmuch as each of the semi rigid parts may replace more that one existing parts, thereby reducing the sewing time. By way of example, an elongated piece as shown in FIG. 7 may replace the bottom portion of the main body as well as the whole outer shell and the bottom and reinforcement patches of a combo bag as shown in FIGS. 2 to 6, thereby reducing the number of parts and time required for their assembly. Pieces molded with a different shape may even replace the whole main body and the end patches. Moreover, thanks to its structure, the molded piece whatever be its shape may be attached to the remaining parts or portions of the combo bag by means of staples, instead of having to be sewn. Thus, the production time is substantially reduced and the whole manufacturing process may even be automated, thereby resulting in the production of bags, especially combo bags, that are not only very efficient but also cheaper.

It is known that when the molten metal is poured into the bag and hits the bottom of the same, its weight causes a deformation of the fabric parts, which has to be taken into consideration when manufacturing the bag. With the present invention which provides a bag having at least some of its parts that are moldable and rigid, one may "pre-program" the deformation that is required to achieve the best distribution within the mold. By doing so, one may ensure a systematic and constant molten metal distribution.

In all cases, an important factor is that the rigid parts, especially at the bottom of the bag remain rigid throughout the cast.

As it can also be appreciated, with the invention the fabric material Will not be wetted by the molten metal. Therefore, no smoke or toxic fumes will be generated when the cast starts.

In accordance with a particularly preferred embodiment of the invention, at least some and preferably all of the other parts of the bag that are made of an open-weave heat-resistant fabric and formed open areas through which the cast metal, may flow, are also rigidified and protected by application thereto of a heat-resistant coating.

Figure 8:
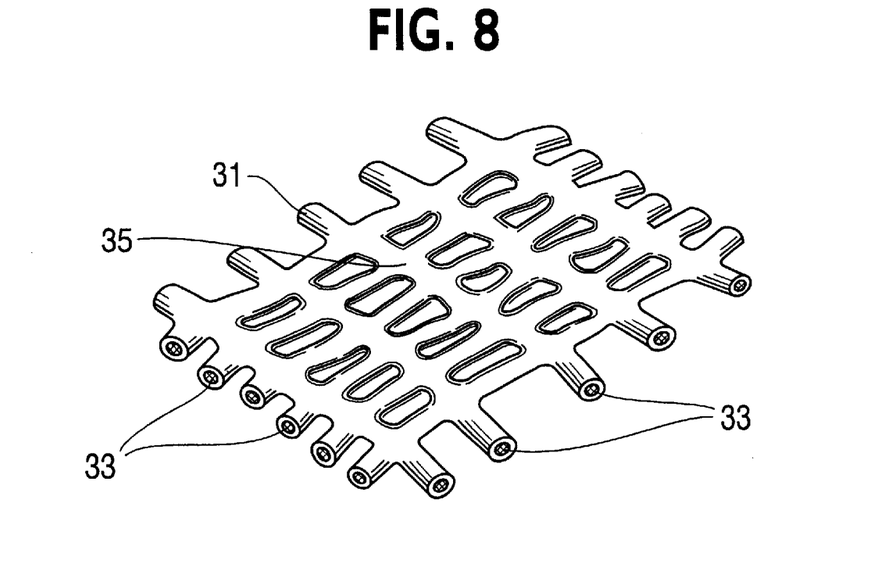
FIG. 8 is a cross-sectional view of an open-weave heat-resistant fabric that can be used in accordance with the invention to make the open areas of the channel or combo bag.

As shown in FIG. 8, the coating 31 is applied to the yarns 33 of the fabric after weaving. Such an application can be made by spraying or by dipping.

The coating must of course be heat-resistant and compatible with the fabric. It must also leave open the gaps 35 between the yarns 33. It must further be able to rigidify after application, either naturally after drying and/or by application of a heat-treatment.

As such a coating, use can made of the F8 finish sold by BORDEN CHEMICAL, which is mainly composed of phenolic resin sold under the trademark BORDEN DURITE AL 5801-A®. After heat-treatment within a furnace, this finish gives the requested protection and rigidity to the fabric on which it is applied. However, after a while (1 and 5 minutes) in use this rigidity disappears and toxic fumes may be generated.

As a coating, use can also be made of a modified wollastonite based slurry, which is applied to the yarns after weaving. This slurry coats the yarns and protect and rigidify them after drying. Advantageously, the drying step can be carried out in a heated mold. This permits to give to the fabric the shape of the requested bag without sewing operations.

In accordance with a particularly preferred embodiment of the inventions, the modified wollastonite-base slurry used as a coating as mentioned hereinabove, can be an aqueous suspension of wollastonite, colloidal silica and sugar, as disclosed in copending patent application Ser. No. 09/020, 847 filed on Feb. 9, 1998, with designation of Pierre DELVAUX et al as inventors. The aqueous suspension disclosed in this U.S. application which is incorporated herein by reference, is actually intended to be used for coating, protecting and rigidifying a fabric made of heat-resistant fibers. To do so, it must have a sufficient viscosity to cover the fibers of the fabric while avoiding obturating the free spaces between these fibers.

Preferably, the suspension is formulated in such a manner that:
  it contains from 30 to 50% by weight of solids;
  the colloidal silica and wollastonite are present in a weight ratio of colloidal silica to wollastonite ranging from 0.5 to 1.2; and
  the sugar amounts to at least 25% by weight of the suspension and is present in a weight ratio of sugar to wollastonite+colloidal silica +sugar ranging from 0.55 to 1.0.

The fabric made of the heat-resistant fibers can be coated, protected and rigidified by depositing the above described suspension onto the fabric in order to impregnate the fibers and by subsequently eliminating any excess of said suspension to avoid obturating in the free spaces or gaps between the fibers of the fabric. Then, the fabric can be dried at a temperature ranging from 130 to 160° C. and be given a requested form by thermosetting treatment at a softening temperature ranging from 160 to 200° C. Last of all, the thermoset fabric can be subjected to a thermal treatment at a temperature above 200° C. and up to 400° C. in order to convert the organic part of the suspension into polymeric carbon and/or to fully eliminate this organic part.

The so-obtained, inorganic coating is particularly interesting in that it is non-toxic and smokeless. It also has a very good chemical resistance to molten metal, especially molten aluminum, and it gives to the bag a rigid shape that remains as such throughout the cast. As aforesaid, this is not the actual behaviour with the standard sewn combo bags.

As can be appreciated, the coating forms a rigid skeleton which increases the mechanical properties of the yarns at molten metal temperature. So, a cheaper yarn construction may be used, with similar mechanical properties in terms of resistance.

As it has been mentioned hereinabove in the Summary of the invention, another object of the invention that derives from the technology described hereinabove, is to provide another kind of filtration and distribution device for a molten metal, which is fast and easy to manufacture, and which, contrary to the combo and channel bags used so far in the industry, can be completely immersed into the molten metal. When it is so immersed, this device acts as a "diffuser".

Figure 9:
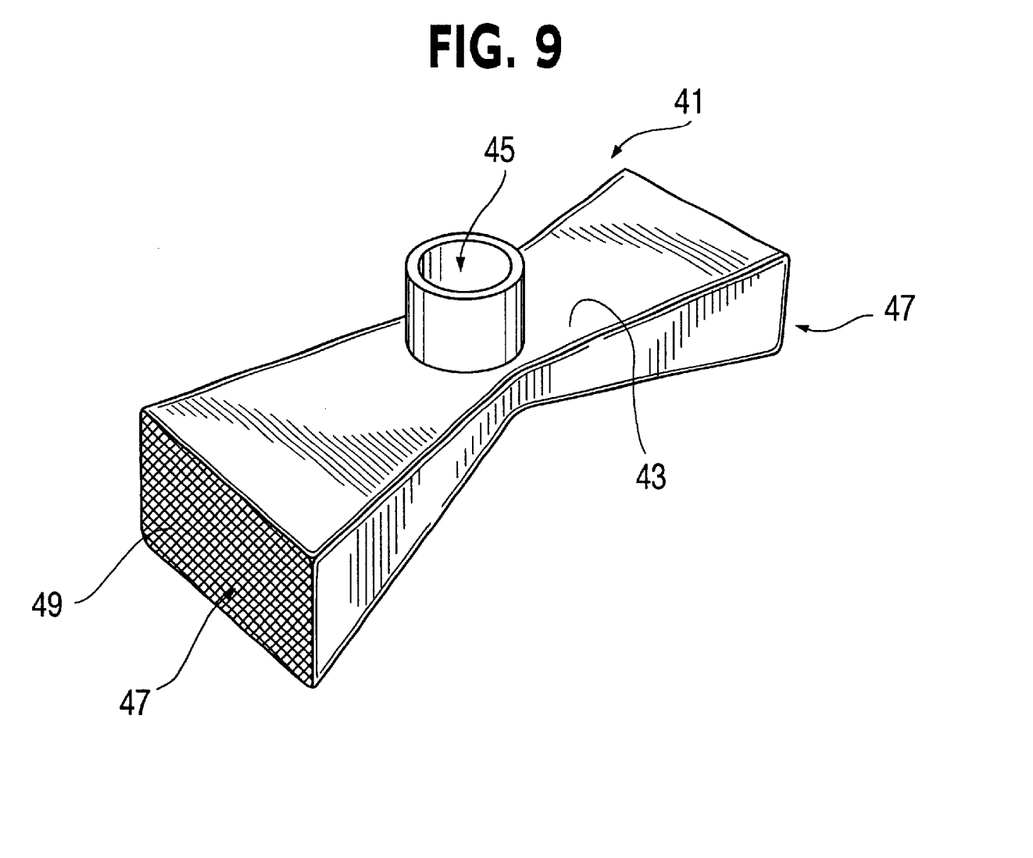
FIG. 9 is a perspective view of a filtration and distribution device for a molten metal according to another embodiment of the invention.

An example of such a distribution device numbered 41 is shown in FIG. 9. It comprises a hollow body 43, provided with an inlet 45 connectable to a molten metal feed pipe. It also comprises at least one and preferably two or more outlets 47 through which the molten metal fed into the body 43 may escape. This hollow body is made of the very same moldable and thermo-formable composite as already mentioned hereinabove.

Thanks to its structure, this device 41 can be immersed into the molten metal and thus be used as a diffuser. Preferably, each of its outlets 47 "closed" by a screen 49 made of the very same type of open weave heat-resistant fabric with yarns rigidified and protected by a heat-resistant coating as mentioned hereinabove. Thus, the device may act not only as a diffuser but also as a filter.

Of course, numerous modifications can be made to the devices disclosed hereinabove and/or to the formulation of the matrix and coating used to make the same without departing from the scope of the present invention as defined in the appended claims.

What is claimed is:

1. A filtration and distribution device for a molten metal, which is in the form of a bag having parts made of a solid heat-resistant fabric and open areas made of an open weave heat-resistant fabric, wherein at least some of said parts made of said solid heat-resistant fabric are replaced by rigid parts made of a moldable or thermo-formable composite consisting of an open weave heat-resistant fabric embedded into a matrix made of a heat-resistant inorganic material compatible with said open weave heat-resistant fabric and wherein the matrix is prepared from a moldable refractory composition in the form of a slurry which comprises:

from 8 to 25% by weight of an aqueous phosphoric acid solution having a concentration of phosphoric acid ranging from 40 to 85% by weight, said phosphoric acid having up to 50% of its primary acidic functions neutralized by reaction with vermiculite; and from 75 to 92% by weight of a mixture containing wollastonite and an aqueous suspension containing from 20 to 40% by weight of colloidal silica in a weight ratio of said aqueous suspension to said wollastonite ranging from 0.5 to 1.2.

2. The device according to claim 1, wherein the bag is a combo bag comprising a main body, an outer shell, end patches, bottom and reinforcement patches and position tabs sewn altogether and wherein the parts of said combo bag that are replaced by said rigid parts are selected from the group consisting of said main body, outer shell, end patches, bottom and reinforcement patches and positioning tabs.

3. The device according to claim 2, wherein all the heat-resistant fabrics consist of glass fiber fabrics and, in the moldable refractory composition:

the aqueous phosphoric acid solution has a concentration of phosphoric acid equal to about 55% by weight;

the primary acidic functions of the phosphoric acid contained in the aqueous phosphoric acid solution are neutralized by reaction of 1 part by weight of vermiculite per 5 parts by weight of said aqueous phosphoric acid solution;

the aqueous suspension contains about 40% by weight of colloidal silica and about 60% by weight of water; and the composition comprises from 10 to 20% by weight of said aqueous phosphoric acid solution partially neutralized with vermiculite.

4. The device according to claim 1, wherein the bag is a channel bag comprising a pan having a bottom portion and side portions and wherein the parts of said channel bag that are replaced by said rigid parts are parts of said bottom portion and side portions.

5. The device according to claim 4, wherein all the heat-resistant fabrics consist of glass fiber fabrics and, in the moldable refractory composition:

the aqueous phosphoric acid solution has a concentration of phosphoric acid equal to about 55% by weight;

the primary acidic functions of the phosphoric acid contained in the aqueous phosphoric acid solution are neutralized by reaction of 1 part by weight of vermiculite per 5 parts by weight of said aqueous phosphoric acid solution;

the aqueous suspension contains about 40% by weight of colloidal silica and about 60% by weight of water; and the composition comprises from 10 to 20% by weight of said aqueous phosphoric acid solution partially neutralized with vermiculite.

6. A filtration and distribution device for a molten metal, which is in the form of a bag having parts made of a solid heat-resistant fabric and open areas made of an open weave heat-resistant fabric;

wherein at least some of said parts made of said solid heat-resistant fabric are replaced by rigid parts made of a moldable or thermo-formable composite consisting of an open weave heat-resistant fabric embedded into a matrix made of a heat-resistant inorganic material compatible with said open weave heat-resistant fabric;

wherein the open weave heat-resistant fabrics forming the open areas of the bag are made of yarns that are rigidified and protected by a heat-resistant coating;

wherein said heat-resistant coating is prepared from an aqueous suspension of wollastonite, colloidal silica and sugar having a sufficient viscosity to cover the fibers of the fabric while avoiding obturating the free spaces between said fibers, and wherein;

said suspension contains from 30 to 50% by weight of solids;

the colloidal silica and wollastonite are present in a weight ratio of colloidal silica to wollastonite ranging from 0.5 to 1.2; and the sugar amounts to at least 25% by weight of the suspension and is present in a weight ratio of sugar to wollastonite+colloidal silica+sugar ranging from 0.55 to 1.0.

7. The device according of claim 2, wherein the open weave heat-resistant fabrics forming the open areas of the bag is made of yarns that are rigidified and protected by a heat-resistant coating.

8. The device according to claim 7, wherein said heat-resistant coating is prepared from an aqueous suspension of wollastonite, colloidal silica and sugar having a sufficient viscosity to cover the fibers of the fabric while avoiding obturating the free spaces between said fibers, and wherein:

said suspension contains from 30 to 50% by weight of solids;

the colloidal silica and wollastonite are present in a weight ratio of colloidal silica to wollastonite ranging from 0.5 to 1.2; and the sugar amounts to at least 25% by weight of the suspension and is present in a weight ratio of sugar to wollastonite+colloidal silica +sugar ranging from 0.55 to 1.0.

9. The device according of claim 4, wherein the open weave heat-resistant fabrics forming the open areas of the bag is made of yarns that are rigidified and protected by a heat-resistant coating.

10. The device according to claim 9, wherein said heat-resistant coating is prepared from an aqueous suspension of wollastonite, colloidal silica and sugar having a sufficient viscosity to cover the fibers of the fabric while avoiding obturating the free spaces between said fibers, and wherein:

said suspension contains from 30 to 50% by weight of solids;

the colloidal silica and wollastonite are present in a weight ratio of colloidal silica to wollastonite ranging from 0.5 to 1.2; and the sugar amounts to at least 25% by weight of the suspension and is present in a weight ratio of sugar to wollastonite+colloidal silica +sugar ranging from 0.55 to 1.0.

11. A distribution device for a molten metal, comprising a hollow body provided with an inlet connectable to a molten metal feed pipe and at least one outlet through which the molten metal fed into the hollow body may escape, wherein said hollow body is made of a moldable or thermo-formable composite consisting of an open weave heat-resistant fabric embedded into a matrix made of a heat-resistant inorganic material compatible with said open weave heat-resistant fabric and wherein said matrix is prepared from a moldable refractory composition in the form of a slurry which comprises:

from 8 to 25% by weight of an aqueous phosphoric acid solution having a concentration of phosphoric acid ranging from 40 to 85% by weight, said phosphoric acid having up to 50% of its primary acidic functions neutralized by reaction with vermiculite; and from 75 to 92% by weight of a mixture containing wollastonite and an aqueous suspension containing from 20 to 40% by weight of colloidal silica in a weight ratio of said aqueous suspension to said wollastonite ranging from 0.5 to 1.2.

12. A distribution device for a molten metal comprising a hollow body provided with an inlet connectable to a molten metal feed pipe and at least one outlet through which the molten metal fed into the hollow body may escape;

wherein said hollow body is made of a moldable or thermo-formable composite consisting of an open weave heat-resistant fabric embedded into a matrix made of a heat-resistant inorganic material compatible with said open weave heat-resistant fabric;

wherein said at least one outlet is provided with a screen made of an open weave heat-resistant fabric having yarns that are rigidified and protected by a heat-resistant coating;

wherein said heat-resistant coating is prepared from an aqueous suspension of wollastonite, colloidal silica and sugar having a sufficient viscosity to cover the fibers of the fabric while avoiding obturating the free spaces between said fibers, and wherein:

said suspension contains from 30 to 50% by weight of solids;

the colloidal silica and wollastonite are present in a weight ratio of colloidal silica to wollastonite ranging from 0.5 to 1.2; and the sugar amounts to at least 25% by weight of the suspension and is present in a weight ratio of sugar to wollastonite+colloidal silica+sugar ranging from 0.55 to 1.0.

13. The device of claim 12, wherein the matrix is prepared from a moldable refractory composition comprising:

8 to 25% by weight of an aqueous phosphoric acid solution having a concentration of phosphoric acid ranging from 40 to 85% by weight, said phosphoric acid having up to 50% of its primary acidic functions neutralized by reaction with vermiculite; and 75 to 92% by weight of a mixture containing wollastonite and an aqueous suspension containing from 20 to 40% by weight of colloidal silica in a weight ratio of said aqueous suspension to said wollastonite ranging from 0.5 to 1.2.

14. The device according to claim 12, wherein said hollow body comprises at least two of said at least one outlet, which are spaced apart.

15. The device of claim according to claim 13, wherein said hollow body comprises at least two of said at least one outlet, which are spaced apart.

* * * * *